(12) United States Patent
Chen et al.

(10) Patent No.: US 10,236,489 B2
(45) Date of Patent: Mar. 19, 2019

(54) END PLATE OF BATTERY MODULE AND BATTERY MODULE

(71) Applicant: CONTEMPORARY AMPEREX TECHNOLOGY CO., LIMITED, Ningde, Fujian Province (CN)

(72) Inventors: Zhiming Chen, Ningde (CN); Lin Ma, Ningde (CN); Liangmei Chen, Ningde (CN)

(73) Assignee: CONTEMPORARY AMPEREX TECHNOLOGY CO., LIMITED (CN)

( * ) Notice: Subject to any disclaimer, the term of this patent is extended or adjusted under 35 U.S.C. 154(b) by 53 days.

(21) Appl. No.: 15/648,496

(22) Filed: Jul. 13, 2017

(65) Prior Publication Data
US 2018/0034024 A1 Feb. 1, 2018

(30) Foreign Application Priority Data

Jul. 28, 2016 (CN) .................... 2016 2 0801338 U

(51) Int. Cl.
| H01M 2/00 | (2006.01) |
| H01M 2/10 | (2006.01) |
| H01M 10/659 | (2014.01) |
| H01M 6/50 | (2006.01) |

(52) U.S. Cl.
CPC ....... *H01M 2/1094* (2013.01); *H01M 2/1016* (2013.01); *H01M 2/1077* (2013.01); *H01M 6/5038* (2013.01); *H01M 10/659* (2015.04)

(58) Field of Classification Search
CPC ...................................... H01M 2/00
See application file for complete search history.

(56) References Cited

U.S. PATENT DOCUMENTS

2011/0091786 A1* 4/2011 Matsumoto ........... H01M 8/241
429/469
2015/0093607 A1 4/2015 Kuriyama et al.

FOREIGN PATENT DOCUMENTS

EP 2958165 A1 12/2015

OTHER PUBLICATIONS

Extended European Search Report for corresponding European Patent Application No. 17181356.1, dated Jan. 9, 2018, pp. 1-7.

* cited by examiner

*Primary Examiner* — Jacob B Marks
(74) *Attorney, Agent, or Firm* — Tarolli, Sundheim, Covell & Tummino LLP

(57) ABSTRACT

The present application relates to the field of battery production techniques and, particularly relates to an end plate for battery module and a battery module. The end plate includes a panel, an elastic member and a buffer plate, the panel and the buffer plate are stacked, a supporting hole is defined in the buffer plate, the supporting hole is a through hole along a thickness direction of the buffer plate, the elastic member is filled in the supporting hole, and an end of the elastic member abuts against the panel tinder such structure, the end plate can be avoided from directly squeezing the cell in the battery module, so as to protect the cell and guarantee safety of the battery module.

10 Claims, 2 Drawing Sheets

END PLATE OF BATTERY MODULE AND BATTERY MODULE

CROSS-REFERENCE TO RELATED APPLICATIONS

The present application claims priority to Chinese Patent Application No. 201620801338.1, filed on Jul. 28, 2016, the content of which is incorporated herein by reference in its entirety.

TECHNICAL FIELD

The present application relates to the field of battery production techniques and, particularly, relates to an end plate of a battery module and a battery module.

BACKGROUND

The existing battery module includes a housing and a cell, and the cell is displaced in the housing. The housing includes an end plate and a side plate, each of the end plate and the side plate is a single layer of metal plate, and the end plate is welded with the side plate by laser. However, since the end plate is a single layer of metal plate with small elastic deformation, the end plate will directly squeeze the cell in the housing when the battery module is subjected to an external impact, which therefore causes deformation of the cell and a series of safety problems.

SUMMARY

The present application provides an end plate of a battery module and a battery module, which can buffer the external impact and thus guarantee safety of the battery module.

A first aspect of the present application provides an end plate for a battery module including a panel, an elastic member and a buffer plate, the panel and the buffer plate are stacked, a supporting hole is defined in the buffer plate, the supporting hole is a through hole along a thickness direction of the buffer plate, the elastic member is filled in the supporting hole, and an end of the elastic member abuts against the panel.

Preferably, the elastic member is made of at least one of resin, spring and rubber.

Preferably, the end plate further includes a temperature control member; a temperature control hole is defined in the buffer plate, the temperature control member is filled in the temperature control hole, and an end of the temperature control member is attached to the panel.

Preferably, the elastic member and the panel are integrated as a whole.

Preferably, the end plate further includes an adhesive located between the panel and the buffer plate.

Preferably, the panel is made of resin, a slot is defined at each of two sides of the buffer plate, and the adhesive slot is filled with the adhesive and/or the resin.

Preferably, the slot includes a plurality of transverse slots and a plurality of longitudinal slots, the plurality of transverse slots and the plurality of longitudinal slots intersect with each other, and the supporting hole is defined at an intersection of one of the plurality of transverse slots and one of the plurality of longitudinal slots.

Preferably, one of the temperature control hole is defined in each area defined by every two adjacent transverse slots and every two adjacent longitudinal slots.

Preferably, the buffer plate is made of foam.

Preferably, the panel is a continuous fiber-reinforced resin plate.

Preferably, the continuous fiber-reinforced resin plate is a composite of one of unsaturated polyester resin, unsaturated epoxy vinyl polyester resin, epoxy resin and phenolic resin, and at least one of fiberglass mesh, axial glass fabric, fiberglass complex felt, carbon-fiber mesh, axial carbon-fiber fabric and carbon-fiber complex felt.

Preferably, an elasticity coefficient of the elastic member is greater than an elasticity coefficient of the buffer plate.

Preferably, the end plate includes two panels, the buffer plate is located between the two panels, and two ends of the elastic member abut against the two panels, respectively.

A second aspect of the present application provides a battery module including a cell, a side plate and the end plate mentioned in any of the above paragraphs, the side plate is connected with the end plate, and the buffer plate is closer to the cell than the panel when the end plate includes only one panel.

Preferably, the side plate includes a bending edge, the bending edge bends toward an interior of the battery module, and the end plate is connected with the bending edge of the side plate.

Preferably, the end plate is located at an inner side of the bending edge.

Preferably, an adhesive is filled between the end plate and the bending edge.

The solutions provided by the present application have the following beneficial effects:

Since the end plate provided by the present application is formed by the panel and the buffer plate, the buffer plate and/or the elastic member can elastically deform to buffer the impact force when the battery module is subjected to an external impact, so as to avoid the end plate from directly squeezing the cell. Therefore, the cell is protected and the safety of the battery module is guaranteed.

It should be understood that, the general description above and the detailed description below are merely exemplary and cannot limit the present application.

Figure 1:
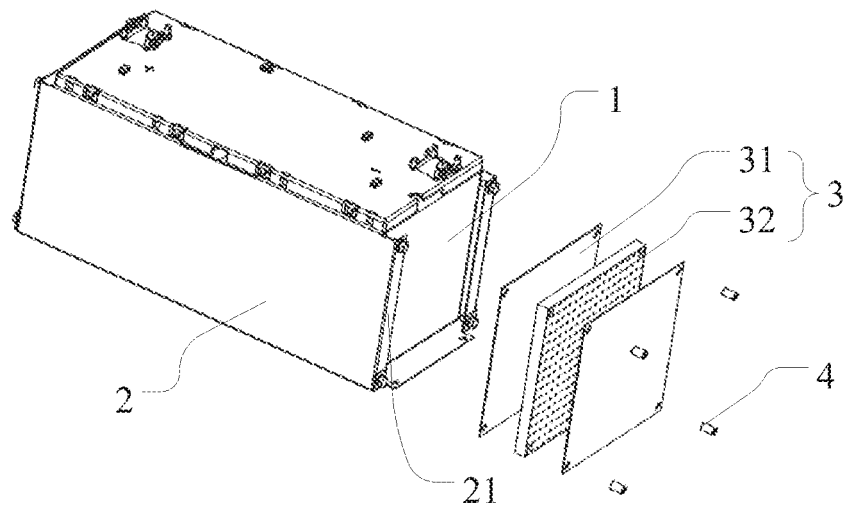
FIG. 1 is an exploded view of a battery module according to an embodiment of the present application.

Reference signs:

1-cell;
2-side plate;
  21-bending edge;
3-end plate;
  31-panel;
  32-buffer plate;
    321-slot;
    322-supporting hole;
    323-temperature control hole;
  33-elastic member;
4-screw.

The accompanying drawings herein are incorporated into the description and constitute a part of the description, which show embodiments of the present application and are used to explain the principles of the present application together with the description.

DESCRIPTION OF EMBODIMENTS

The present application is described in further details by the embodiments with reference to the drawings. All the expressions "front", "back", "left", "right", "up" and "down" herein are referred to on the basis of a placement state in the drawings.

Figure 2:
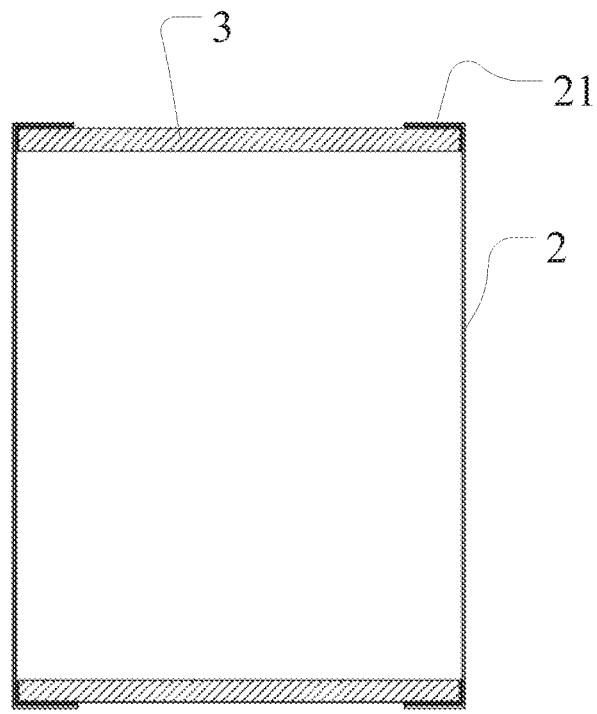
FIG. 2 is a sectional view of an end plate and a side plate of a battery module in an assembled state according to an embodiment of the present application.

As shown in FIG. 1 and FIG. 2, the present application provides a battery module, and the battery module includes a cell 1, a side plate 2 and an end plate 3. The side plate 2 is connected with the end plate 3, and the side plate 2 and the end plate 3 package the cell 1.

Figure 3:
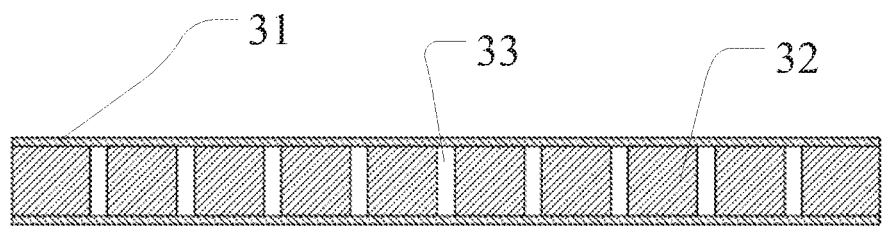
FIG. 3 is a sectional view of an end plate according to an embodiment of the present application.
Figure 4:
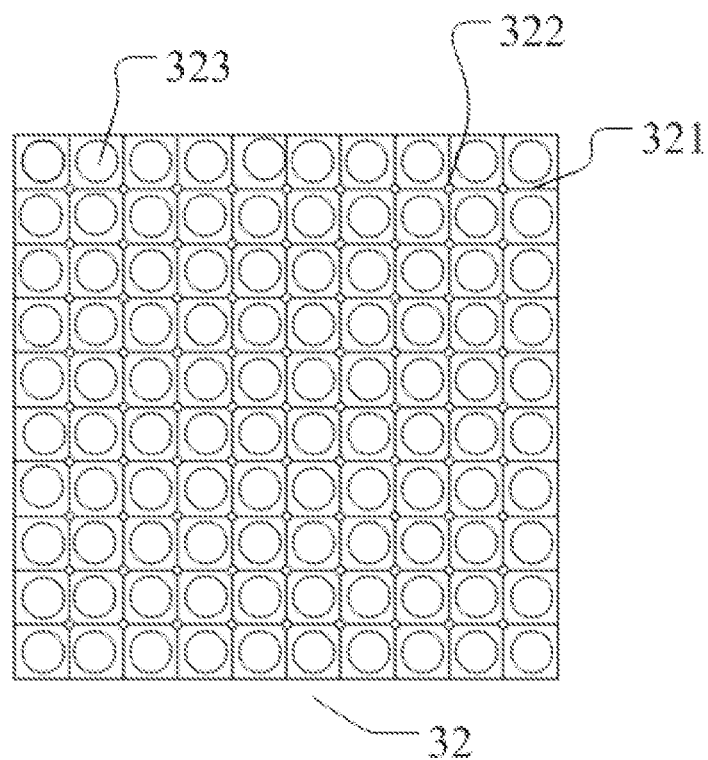
FIG. 4 is a front view of a buffer plate of an end plate according to an embodiment of the present application.

As shown in FIG. 3 and FIG. 4, the end plate 3 includes a panel 31, an elastic member 33 and a buffer plate 32. The panel 31 and the buffer plate 32 are stacked, i.e., the panel 31 is parallel to the buffer plate 32 and is attached to the buffer plate 32. A supporting hole 322 is defined in the buffer plate 32, and the supporting hole 322 is a through hole along a thickness direction of the buffer plate 32. The elastic member 33 is inserted in the supporting hole 322, and an end of the elastic member 33 abuts against the panel 31. The end plate 3 further includes a temperature control member.

Since the end plate 3 is formed by the panel 31 and the buffer plate 32, when the battery module is subjected to an external impact, the buffer plate 32 and/or the elastic member 33 can deform to buffer the impact force, so as to avoid the end plate 3 from directly squeezing the cell 1. Therefore, the cell 1 is protected and the safety of the battery module is guaranteed.

An elasticity coefficient of the elastic member 33 may be greater than, equal to, or smaller than an elasticity coefficient of the buffer plate 32. Preferably, the elasticity coefficient of the elastic member 33 is greater than the elasticity coefficient of the buffer plate 32, so as to avoid elastic failure of the buffer plate 32. During assembling of the end plate 3 with the side plate 2, the elastic member 33 forms a frame with no deformation or slight deformation to resist against the compression force during assembling, so as to buffer the squeeze to the cell 1 resulted from too much assembling force. In the meantime, even if a high internal expansion force is generated when the battery module is in use or an accident occurs, the elastic member 33 can play a major role in resisting against deformation, and the buffer plate 32 can play a secondary role in resisting against deformation. When the deformation amount generated due to an external force is less than a reversible deformation amount of the elastic member 33 and the buffer plate 32, the elastic member 33 and the buffer plate 32 will recover to the original state after the external force is withdrew. When the external force is excessively great, the elastic member 33 and the buffer plate 32 will irreversibly deform to buffer the external force in a certain extent, so as to reduce the damage caused by the external force to the battery module. The panel 31 can be a metal plate or a resin plate, and the panel 31 is preferred to be a resin plate, so as to reduce the overall weight of the battery module. Further, in order to increase the strength of the panel 31, the resin plate is preferably a continuous fiber-reinforced resin plate, and the continuous fiber-reinforced resin plate is a composite of one of unsaturated polyester resin, unsaturated epoxy vinyl polyester resin, epoxy resin and phenolic resin, and at least one of fiberglass mesh, axial glass fabric, fiberglass complex felt, carbon-fiber mesh, axial carbon-fiber fabric and carbon-fiber complex felt, so as to facilitate the processing and forming. The panel 31 and the elastic member 33 cooperatively form a frame which plays a major role in resisting against deformation during assembling.

The buffer plate 32 may be made of foam, for example, polyvinyl chloride foam (PVC foam), polyurethane foam (PU foam), polyethylene terephthalate foam (PET foam), polymethacrylimide foam (PMI foam), etc., or made of other elastic materials, for example, rubber, etc. The buffer plate 32 is preferably made of foam, so as to facilitate the forming.

The elastic member 33 may be made of at least one of resin, spring and rubber, so as to facilitate material acquiring and forming. The supporting hole 322 is fitted to the elastic member 33, so that it is guaranteed that the elastic member 33 merely deforms elastically along a thickness direction of the buffer plate 32 to have a better buffering effect.

The elastic member 33 and the panel 31 can be integrated as a whole, or separately formed and then connected with each other. The elastic member 33 and the panel 31 are preferably integrated as a whole, particularly, when both the panel 31 and the elastic member 33 are made of resin, the elastic member 33 and the panel 31 can be integrated as a whole by vacuum molding or resin transfer molding (Resin Transfer Molding, ™), so as to improve connection reliability of the end plate 3 and simplify the assembling procedure.

The end plate 3 may further include a temperature control member, and the temperature control member may be made of a solid-solid phase change material or a solid-liquid phase change material, and the panel 31 is covered by a solid-liquid phase change material. When the temperature control member is included, a temperature control hole 323 is defined in the buffer plate 32, the temperature control member is filled into the temperature control hole 323, and an end of the temperature control member is attached to the panel 31. Therefore, the heat exchange between the interior of the battery module and the external environment can be accelerated when the temperature in the battery module is strictly required, so as to guarantee the temperature of the battery module.

The panel 31 can be connected with the buffer plate 32 by adhering, clamping or screwing, and adhering is preferred so as to increase attachment degree between the panel 31 and the buffer plate 32. When the panel 31 is adhered with the buffer plate 32, the end plate 3 further includes an adhesive (i.e., a structural adhesive) located between the panel 31 and the buffer plate 32. The adhesive may be a double-component polyurethane adhesive, an acrylic adhesive or an epoxy resin adhesive. The adhesive can also be a heat conductive adhesive which can increase heat conduction of the battery module.

In order to provide better adhesive bonding effect, a slot 321 is defined at each of two sides of the buffer plate 32, and the adhesive is filled in the slot 321. When the panel 31 is made of a resin, the slot 321 may be filled with the resin, or be filled with the adhesive and the resin.

The slot 321 may merely include a transverse slot or a longitudinal slot. Or, the slot 321 may form a crisscrossing adhesive bonding structure to increase the adhesive bonding effect between the panel 31 and the buffer plate 32, as shown in FIG. 4, the slot 321 includes a plurality of transverse slots and a plurality of longitudinal slots, and the plurality of transverse slots and the plurality of longitudinal slots intersect with each other, e.g., perpendicularly or with a non-right included angle. A plurality of supporting holes 322 may be defined at intersections of the plurality of transverse slots and the plurality of longitudinal slots, so as to guarantee the strength of the buffer plate 32.

When the temperature control hole 323 is defined in the buffer plate 32, the temperature control hole 323 may be defined in any position of the transverse slot or the longitudinal slot, or an area defined by every two adjacent transverse slots and every two adjacent longitudinal slots is provided with a plurality of temperature control holes 323. Preferably, an area defined by every two adjacent transverse slots and every two adjacent longitudinal slots is provided with one temperature control hole 323, so as to guarantee the strength of the buffer plate 32.

The end plate 3 may include only one panel 31, and the buffer plate 32 is closer to the cell 1 of the battery module than the panel 31; or, the end plate 3 includes two panels 31. Preferably, the end plate 3 includes two panels 31, the buffer plate 32 is located between the two panels 31, and two ends of the elastic member 33 abut against the two panels 31, respectively. When the temperature control member is included, two ends of the temperature control member abut against the two panels 31, respectively. With the two panels 31, the end plate 3 is formed into a "sandwich" structure and has improved reliability.

The side plate 2 may include a bending edge 21, the bending edge 21 bends toward the interior of the battery module, and the end plate 3 is connected with the bending edge 21 of the side plate 2. With the bending edge 21, the contact area between the end plate 3 and the side plate 2 is increased, and the connection reliability of the end plate 2 and the side plate 2 is guaranteed.

The end plate 3 may be located at the inner side of the bending edge 21, i.e., the end plate 3 is located at a side of the bending edge 21 close to the cell 1. Or, the end plate 3 is located at the outer side of the bending edge 21, i.e., the end plate 3 is located at a side of the bending edge 21 away from the cell 1. Preferably, the end plate 3 is located at the inner side of the bending edge 21 and is close to the cell 1, so that the position of the end plate 3 can be limited during assembling of the end plate 3 with the side plate 2, and the end plate 3 could be closer to the cell 1, so as to provide better heat conduction effect.

The end plate 3 may be adhered with the side plate 2, especially, when the side plate 2 include the bending edge 21, an adhesive is filled between the end plate 3 and the bending edge 21. The end plate 3 may also be connected with the side plate 2 by clamping or screwing, as shown in FIG. 1, the end plate 3 is connected with the side plate by a screw 4. Preferably, the end plate 3 is adhered with the side plate 2 and, at the same time, the end plate 3 is screwed with the side plate 2 by the screw 4, which improves the connection reliability between the end plate 3 and the side plate 2.

The above are merely preferred embodiments of the present application, which are not used to limit the present application. The present application can have various modifications and changes for those skilled in the art. All the amendments, equivalent replacements and improvements made to the present application within the spirit and principles of the present application shall fall into the protection scope of the present application.

What is claimed is:

1. An end plate of a battery module, comprising a panel, an elastic member and a buffer plate, wherein the panel and the buffer plate are stacked, a supporting hole is defined in the buffer plate, the supporting hole is a through hole along a thickness direction of the buffer plate, the elastic member is filled in the supporting hole, and an end of the elastic member abuts against the panel.

2. The end plate of a battery module according to claim 1, further comprising a temperature control member; wherein a temperature control hole is defined in the buffer plate, the temperature control member is filled in the temperature control hole, and an end of the temperature control member is attached to the panel.

3. The end plate of a battery module according to claim 1, wherein the elastic member and the panel are integrated as a whole.

4. The end plate of a battery module according to claim 2, further comprising an adhesive located between the panel and the buffer plate.

5. The end plate of a battery module according to claim 4, wherein the panel is made of a resin, a slot is defined at each of two sides of the buffer plate, and the slot is filled with the adhesive and/or the resin.

6. The end plate of a battery module according to claim 5, wherein the slot comprises a plurality of transverse slots and a plurality of longitudinal slots, the plurality of transverse slots and the plurality of longitudinal slots intersect with each other, and the supporting hole is defined at an intersection of one of the plurality of transverse slots and one of the plurality of longitudinal slots.

7. The end plate of a battery module according to claim 6, wherein one of the temperature control hole is defined in each area defined by every two adjacent transverse slots and every two adjacent longitudinal slots.

8. The end plate of a battery module according to claim 1, comprising two panels, wherein the buffer plate is located between the two panels, and two ends of the elastic member abut against the two panels, respectively.

9. A battery module, comprising a cell, a side plate and the end plate according to claim 1, wherein the side plate is connected with the end plate, and the buffer plate is closer to the cell than the panel when the end plate comprises only one panel.

10. The battery module according to claim 9, wherein the side plate comprises a bending edge, the bending edge bends toward an interior of the battery module, and the end plate is connected with the bending edge of the side plate.

* * * * *